(12) United States Patent
Schellenberg

(10) Patent No.: US 6,367,325 B1
(45) Date of Patent: Apr. 9, 2002

(54) MOTOR VEHICLE FUEL LEVEL SENSOR

(75) Inventor: Aaron Thomas Schellenberg, Ypsilanti, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/482,449

(22) Filed: Jan. 13, 2000

(51) Int. Cl.$^7$ .................. G01F 23/30; G01F 23/36; G01F 23/32; G01F 23/56; G01L 03/26
(52) U.S. Cl. .................. 73/305; 73/313; 73/317; 73/319; 73/113; 73/290 R
(58) Field of Search .................. 73/305, 309, 313, 73/314, 317, 319, 113

(56) References Cited

U.S. PATENT DOCUMENTS

| | | | |
|---|---|---|---|
| 2,460,503 A | 2/1949 | Howe | 73/33 |
| 3,269,184 A | * 8/1966 | O'Connor | 73/309 |
| 3,798,969 A | 3/1974 | Jones, Jr. | 73/309 |
| 4,173,893 A | 11/1979 | Hedrick | 73/304 C |
| 4,521,371 A | 6/1985 | Peck et al. | 376/245 |
| 5,074,148 A | 12/1991 | Lew | 73/290 V |
| 5,133,212 A | 7/1992 | Grills et al. | 73/296 |
| 5,315,873 A | 5/1994 | Jin | 73/309 |
| 5,731,824 A | 3/1998 | Kneezel et al. | 347/7 |
| 5,743,136 A | 4/1998 | Gaston et al. | 73/313 |
| 5,941,122 A | 8/1999 | Nelson et al. | 73/314 |

OTHER PUBLICATIONS

"Capacitive Fuel Level Probe," 1 page, Dec. 14, 1999 printout from Gill Instruments Web page at http://www.gill.co.uk/Auto/Fuel_Probe.htm.

"Computerized Tank Display," 2 pages, Dec. 14, 1999 printout from Centroid Products Web page at http://centroid-products.com/index.html.

* cited by examiner

Primary Examiner—Hezron Williams
Assistant Examiner—Katina Wilson
(74) Attorney, Agent, or Firm—Larry I. Shelton

(57) ABSTRACT

Disclosed herein is a fuel sensor suited for sensing the level of fuel in a motor vehicle fuel tank. The fuel tank includes an interior mounting to which the fuel sensor is affixed. The fuel sensor has a cantilever member extending in a substantially horizontal direction from the mounting to a free end. The cantilever member is substantially rigid but can be deflected in the vertical direction. A probe is affixed at the free end of the cantilever member to extend in a substantially vertical orientation approximately the full height of the fuel tank. A stabilizer member is affixed at one end to the mounting and at an opposing end to the probe. The stabilizer member has a pivot segment between the ends permitting the probe to move vertically but not horizontally. According to Archimedes's principle, the probe encounters a buoyant force equal to the weight of displaced fuel which induces strain in the cantilever member. The strain is detected by a strain gauge rigidly coupled to a surface of the cantilever member. The strain gauge produces a resistance that causes a voltage difference across the strain gauge, when a voltage is applied. This voltage difference is calibrated to indicate the level of fuel in the fuel tank. The probe is lightweight such that it is highly sensitive to small variations in fuel level. Additionally, the sensor include probes of various profiles such that it can be adapted to provide a linear fuel level reading in automobile fuel tanks with irregular profiles.

14 Claims, 2 Drawing Sheets

MOTOR VEHICLE FUEL LEVEL SENSOR

CROSS-REFERENCE TO RELATED APPLICATIONS (Not applicable)

STATEMENT REGARDING FEDERALLY SPONSORED RESEARCH OR DEVELOPMENT (Not applicable)

BACKGROUND OF THE INVENTION

1. Technical Field

The present invention relates to automobile fuel level sensors, and in particular, to fuel sensors using Archimedes's buoyant force principle.

2. Description of the Related Art

Conventional sensors for sensing the level of fuel in a motor vehicle fuel tank include a float which follows the level of the fuel tank due to the buoyant forces acting on the float. The float includes an arm coupled to a variable resistor or resistor card at a contact. As the float moves in accordance with the fuel level, the contact follows a path on the resistor card causing a variable resistance value. A fuel gauge electrically coupled to the resistor pad via a control module measures this variable resistance value and displays a corresponding fuel level.

The performance of float-type fuel sensors is largely effected by the size and configuration of the fuel tank. Fuel tanks in modem automobiles and other motor vehicles are becoming smaller as the engines become increasing more energy efficient. Moreover, in an effort to minimize overall space requirements of the vehicle, fuel tanks in current motor vehicles are configured as needed to fit within available spaces and around other components, such as trunks, tire wells and struts. The size and configuration constraints render float-type fuel sensors disadvantageous for a number of reasons.

First, the float arm must be sized as needed to extend from the variable resistor at one end to the float at the other, pivoting through a radius as the float follows the level of fuel between full and empty fuel levels. Thus, the float arm must be packagable in the fuel tank such that it can travel through a radius sweeping the height of the fuel. Generally, this means that the fuel tank cannot be narrower than the radius swept by the float arm. Consequently, this must be accounted for when designing the fuel tank, which may lead to less then ideal space utilization. Additionally, these fuel sensors are typically less accurate in low-profile fuel tanks wherein the floats travel a lesser path and the corresponding resistance values are less distinctive. This is particularly the case when the tank is full or near empty.

The irregular configuration of modern automobile fuel tanks also causes the volume of fuel added or consumed per change in fluid level height to be non-linear. That is, for example, a float-type fuel probe will inaccurately indicate as the same fuel volume a one inch change in the height of the fuel in two sections of the fuel tank having different cross-sectional areas. Consequently, the output resistance values of the fuel sensor must be specially processed to be calibrated for each fuel tank configuration.

Moreover, due to the mobile nature of motor vehicles, fuel within the fuel tanks is virtually in constant motion while driving. The float and float arm of control fuel sensor are typically repositioned by fuel slosh and inertial forces occurring while the vehicle is moving. For example, changing lanes, turning comers, driving over pot-holes and the like can cause the float and float arm to change the resistance value so that an erroneous fuel level measurement is output to the fuel gauge.

According, an improved fuel level sensor is needed that is particularly suited for use in current motor vehicle fuel tanks.

SUMMARY OF THE INVENTION

The present invention provides a fuel sensor that is suited for sensing the level of fuel in a fuel tank of a motor vehicle. Using Archimedes's principle, buoyant forces acting on a substantially stationary probe are detected by a strain gauge giving resistance values calibrated to indicate the current fuel level in the tank. The probe is sized to fit in a wide variety of fuel tanks. It is lightweight such that it is highly sensitive to small variations in fuel level and substantially reduces errant fuel level measurements from inertial forces and fuel slosh caused by vehicle movement.

Specifically, the fuel sensor is affixed to an interior mounting within the fuel tank. The fuel sensor has a cantilever member extending in a substantially horizontal direction from the mounting to a free end. The cantilever member is substantially rigid but can be deflected in the vertical direction. A probe is affixed at the free end of the cantilever member and extends therefrom in a substantially vertical orientation nearly the entire height of the fuel tank, encountering a vertical buoyancy force equal to the volume of fuel it displaces. A stabilizer member is affixed at one end to the mounting and at an opposing end to the probe. The stabilizer member has a pivot segment between the ends permitting the probe to move vertically but substantially restricting movement of the probe in the horizontal plane. A strain gauge is rigidly coupled to a surface of the cantilever member effecting an electrical change corresponding to the strain in the cantilever member caused by the buoyancy force acting on the probe. This electrical change can be any measurable change in an electrical property, such as resistance, capacitance and inductance, and can be used to indicate the level of fuel in the fuel tank.

In one aspect of the fuel sensor of the present invention, the probe is low-cost and lightweight, preferably of a closed-cell foam, and defines a profile corresponding to the profile of the fuel tank substantially throughout the height of the fuel tank. The probe can be quickly removed from and connected to the cantilever member such that the fuel sensor can be made to include probes of various profiles as needed to use in various fuel tank configurations. Moreover, the low density of the probe makes it sensitive to small changes in fuel level.

In another aspect of the present, the stabilizer member and a fuel delivery module (FDM) cup act to reduce side loads on the probe from fuel sloshing within the fuel tank that can corrupt the fuel level measurement. The FDM cup substantially surrounds the probe and shields the probe from sloshing fuel. The stabilizer member connects the probe at a second end to the fuel tank mounting, and in so doing, provides opposing forces that negate the affect of the side loads on the a cantilever member such that little or no strain is sensed by the strain gauge. Thus, the fuel sensor of the present invention can provide accurate fuel level measurements by mitigating the effects of fuel sloshing.

In another aspect, the cantilever member can be a ceramic board onto which the strain gauge is etched. This integrally bonds the strain gauge to the cantilever member in a cost effective and permanent manner suitable for use in a fuel tank.

The present invention also includes a method for sensing the level of fuel in a motor vehicle fuel tank. The method includes displacing fuel with a sensor probe positioned in a substantially vertical orientation and extending from near a top to near a bottom of the fuel tank. A flexing member to which the probe is attached is deflected by a buoyant force of the fuel acting on the probe equal to the weight of the volume of fuel displaced by the probe. A strain gauge senses the strain in the flexing member resulting from the buoyant force. A voltage difference across the strain gauge is measured and calibrated to correspond to a particular fuel level. The corresponding fuel level is then displayed on a fuel gauge. The method can further include periodically sampling the voltage difference and averaging multiple voltage samples over a prescribed period.

The aforementioned and still other advantages of the present invention will be apparent from the description of the preferred embodiments which follow.

DETAILED DESCRIPTION OF THE PREFERRED EMBODIMENTS

Figure 1:
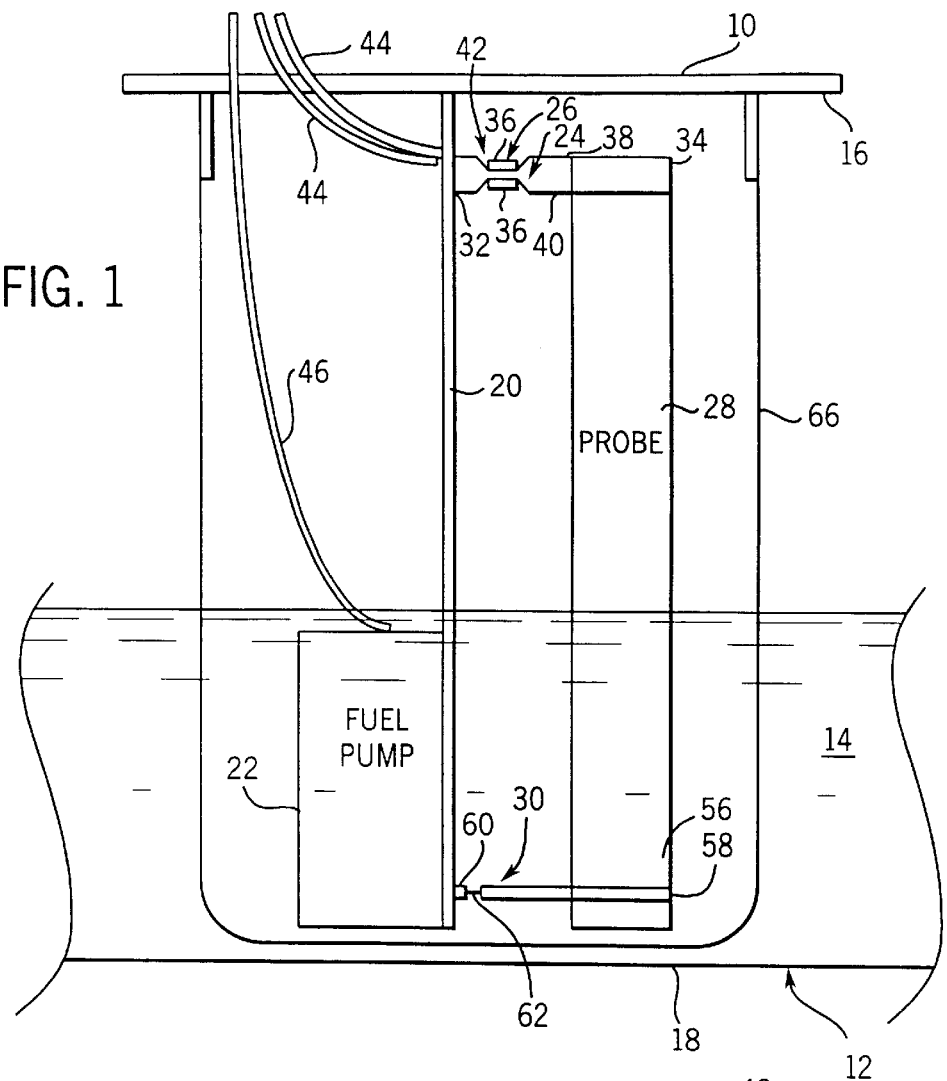
FIG. 1 is a diagrammatic front view of a fuel sensor of the present invention disposed in a motor vehicle fuel tank.

The fuel sensor of the present invention is referred to generally in the drawings by reference numeral 10. Referring to FIG. 1, the fuel sensor is disposed in a fuel tank 12 holding fuel 14 for operating a motor vehicle (not shown), such as an automobile, motorcycle, water craft, tractors, snow blowers, etc. The fuel tank 12 is preferably a suitable non-corrosive material, such as high density polyethylene or coated steel. The fuel tank 12 includes a mounting flange 16 suitably fastened at an outside surface of the fuel tank 12. The mounting flange 16 preferably is disposed at a top of the fuel tank 12 and extends laterally parallel to a bottom surface 18 of the fuel tank 12. A bracket 20 extends downward within the fuel tank 12 from the mounting flange 16 to near the bottom of the fuel tank 12. A fuel pump 22 is suitably fastened at a bottom end of the bracket 20. The mounting flange 16 and the bracket 20 are preferably a rigid plastic, however, stainless steel or other such non-corrosive material may be used.

In a preferred embodiment, the fuel sensor 10 is comprised of a cantilever member 24, a strain gauge 26, a sensor probe 28 and a stabilizer member 30. Generally, the sensor probe 28 is joined to the bracket 20 at one end by the cantilever member 24 and at the other by the stabilizer member 30. More specifically, the cantilever member 24 is joined to the bracket 20 at a fixed end 32 preferably by a rigid connection. The fixed end 32 may also be secured by a suitable adhesive; however, because the fuel 14 may weaken the bond of the adhesive, a snap-fit or other such connection is preferred. The cantilever member 24 is generally perpendicular to the bracket 20 so that it extends in a generally lateral (or horizontal) direction to a free end 34 to which the sensor probe is attached.

The cantilever member 24 is preferably a semi-rigid material having a modulus of elasticity suitable to hold the sensor probe 28 in a substantially rigid manner but allow deflection in the longitudinal direction when strained by the buoyant forces acting on the sensor probe 28 (described below). Preferably, the cantilever member 24 is a ceramic board such that the strain gauge 26 may be etched onto the cantilever member 24 with a suitable known photo-etching process, which provides an integral union of the strain gauge 26 to the cantilever member 24 not susceptible to degradation from the fuel.

Figure 2:
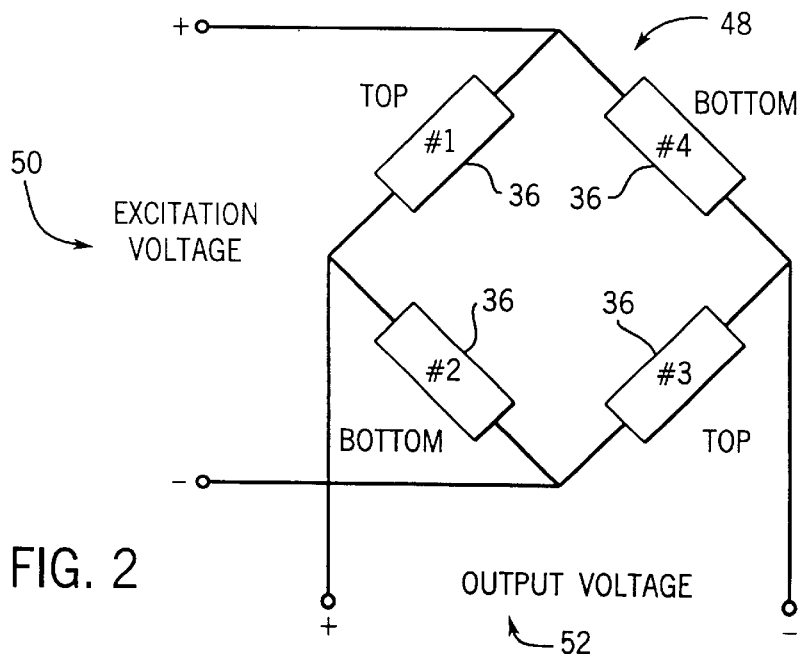
FIG. 2 is a diagrammatic representation of a bridge circuit of a strain gauge used in the fuel sensor of FIG. 1.

The strain gauge 26 is preferably a bonded resistive-type strain gauge, known in the art, having resistive sensing elements 36 (see FIG. 2) affixed to the cantilever member 24 to elongate in proportion to strain in the cantilever member 24. Specifically, two of he sensing elements 36, preferably of a copper-nickel alloy, are etched into each of a top 38 and a bottom surface of the cantilever member 24, at a reduced thickness section 42 sometimes referred to in the art as a "flexure". This flexure 42 provides a location at which the strain in the cantilever member 24 is the highest. The sensing elements 36 are etched in a sinusoidal-type configuration with the lengths of the sensing elements extending laterally.

Preferably, leads 44 couple each of the strain gauge sensing elements 36 to a control module (not shown) located, for example, behind the vehicle's instrument panel (not shown). Lead 46 couples the fuel pump to the control module. Preferably, the sensing elements 36 are coupled in a bridge circuit 48, such as a Wheatstone bridge known in the art and shown in FIG. 2. A suitable input voltage 50 is applied to the bridge circuit 48 and an output voltage 52 is detected, which varies depending upon the resistance of the sensing elements 36 (i.e., the strain in the cantilever member). A Wheatstone bridge circuit is preferred because it amplifies the output voltage and eliminates the affects on the sensing elements resistance of temperature fluctuations. The control module also includes calibration algorithms which are processed to calibrate the strain output voltage with the level of fuel 14 in the fuel tank 12. The control module is coupled to a known fuel gauge (not shown) via direct wires or a network bus (not shown) and a processed fuel level signal is sent preferably as a current to the fuel gauge for display of the fuel gauge.

It should be noted that any other suitable bridge configuration may be used, such as Kelvin and Murray bridges known in the art. Further, the strain gauge 26 may operate on the measurement of other electrical changes in the sensing elements 36 that are proportional to the strain in the cantilever member 24, including capacitive and inductive variations. In which case, the sensing elements 36 may be configured, for example, in a Maxwell bridge or a Schering bridge, respectively, as known in the art. Moreover, the strain gauge 26 may use any other suitable sensing element construction, such as wire or foil, and material, such as a nickel-chrome alloy and tungsten, and be joined to the cantilever member 24 by other methods, such as by a suitable bonding cement or chemical etching technique.

Referring again to FIG. 1, the sensor probe 28 is a generally narrow elongated member such that it can be used in fuel tanks of various shapes and sizes. As mentioned, the sensor probe 28 extends in a longitudinal (or substantially vertical) direction from the free end 34 of the cantilever member 24 from near the top to near the bottom of the fuel tank 12. The sensor probe 28 is preferably attached to the cantilever member 24 by a circumferential groove (not shown) at a top end 54 sized to engage with a bore (not shown) in the cantilever member 24 in a press fit. Other suitable connection methods are envisioned, as well, such as a suitable adhesive. Since the sensor probe 28 does not move, it can extend nearly the full height of the fuel tank 12, thus facilitating an accurate fuel level measurement throughout the range of fuel levels, including at near empty and full fuel levels.

The sensor probe 28 is a closed-cell foam, such that it is buoyant, non-porous and lightweight, preferably no more than 0.25 oz./cm. Such a lightweight sensor probe 28 is more sensitive to small changes in the buoyant force caused by corresponding fuel level fuel changes than is a heavier sensor probe, which provides a highly precise and accurate fuel sensor 10. A lightweight sensor probe 28 also reduces the strain on the cantilever member 24 caused by inertial forces acting on the sensor probe 28 when the vehicle is motion, especially during cornering and when traveling over bumps, which could render the fuel level measurements inaccurate. Moreover, the sensor probe 28 is non-porous so that it does not absorb fuel, which would increase its weight. As alternative to closed-cell foam, the sensor probe 28 may also be formed of a hollow, thin-walled plastic construction or other such lightweight material or construction.

From the cantilever member 24, the sensor probe 28 extends into the fuel tank 12 and thereby displaces a volume of fuel 14. The volume of displaced fuel will vary depending upon the level of fuel 14 in the fuel tank 12. According to the well-known buoyancy principle of Archimedes, the buoyant force acting on the sensor probe 28 is equal to the weight of the displaced fuel. The buoyant force acts in an upward vertical force at the center of displacement (or center of gravity of the displaced fuel volume). The buoyant force can be expressed by the equation:

$$F=\rho g V,$$

wherein the $\rho$ is the density of the fuel, g is the gravitational constant and V is the displaced volume of fuel (i.e., the submerged volume of the sensor probe). Accordingly, depending upon the level of fuel 14 in the fuel tank 12, the sensor probe 28 will exert an upward, downward or no force on the free end 34 of the cantilever member 24, the upward and downward forces inducing strain in the surfaces 38, 40 of the cantilever member 24.

As the fuel level changes, the volume of fuel displaced by the sensor probe 28 changes which in turn changes the buoyant force acting on, and the strain in, the cantilever member 24. As mentioned, as the cantilever member 24 is strained the resistance of the sensing elements 36 in the strain gauge 26 changes. For example, at some fuel level the lower surface 40 of the cantilever member 24 will be under compression so that the lower sensing elements 36 are shortened and have less resistance, while the upper surface 38 is under tension so that the upper sensing elements 36 are elongated and have greater resistance. The converse is true when the fuel level is higher such that the sensor probe 28 exerts an upward force on the cantilever member 24. This change in resistance is proportional to the strain in the cantilever member 24 and is used by the control module and fuel gauge to measure the fuel level in the fuel tank 12, as described above.

It is typically desired that there be a linear relationship between an incremental change in the level of fuel 14 in the fuel tank 12 and the corresponding change in fuel volume, for example, every one inch decrease in fuel level corresponds to one less gallon of fuel. Such a linear relation exists in uniformly-shaped fuel tanks having side walls defining a uniform cross-section throughout the height of the fuel tank. However, in the production of modern vehicles, particularly automobiles, the fuel tank is given low design priority, such that typically it is designed to fit within various spaces under the trunk and around other components, such as struts. As such, current fuel tanks often have complex profiles with non-uniform cross-sections. For these fuel tanks, linearizing the fuel sensor must often be done electronically, rather than mechanically.

Figure 3A:
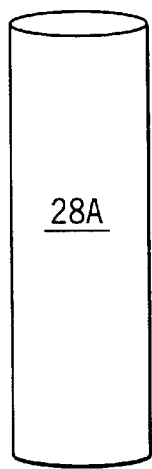
FIGS. 3A–3C are diagrammatic perspective views of sensor probes having different profiles for used in the fuel sensor of FIG. 1.
Figure 3B:
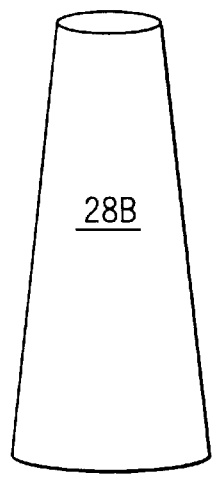
Figure 3C:
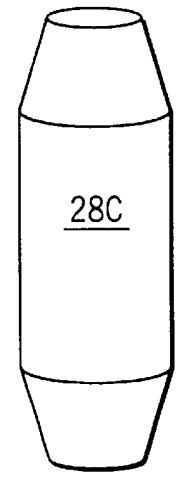

The fuel sensor 10 of the present invention can produce a linearly related output signal by changing the profile of the sensor probe 28 to correspond to the profile of the fuel tank 12 and appropriately calibrating the strain measurements to a given change in fuel volume. Wider/narrower profile sections of the sensor probe correspond to respective wider/narrower fuel tank sections. Thus, for example, the sensor probe 28A of FIG. 3A would be used with a fuel tank having a uniform cross-section. Alternatively, the sensor probe 28B of FIG. 3B would be used with a fuel tank gradually widening at the bottom and the sensor probe 28C of FIG. 3C would be used with a fuel tank having a wider middle portion than its top and bottom. Since the sensor probe 28 is preferably snap-fit to the cantilever member 24, it can be quickly and easily interchanged with sensor probes of various profiles. Moreover, although FIGS. 3A–3C illustrate sensor probes having profiles corresponding to simple uniformity and non-uniformly shaped fuel tanks, the sensor probe 28 could molded or shaped to any number of complex profiles.

Additionally, when the vehicle is in motion, especially during cornering or when traveling over rough terrain, the fuel 14 is not static, but rather sloshes about within the fuel tank 12. This sloshing makes accurate fuel level measurements difficult principally for two reasons. First, the fuel level in any particular location within the fuel tank 12 is constantly changing, usually in a sporadic manner, such that the fuel volume displaced by the sensor probe 28, and consequently the corresponding strain, often fluctuates widely. Second, the sloshing fuel causes loads acting on the sides of the sensor probe 28. These side loads can induce a moment about the free end 34 of the cantilever member 24 which induces strain in the cantilever member 24 and corrupts the measurement of the fuel level.

Referring again to FIG. 1, this side load induced strain can be significantly reduced by the stabilizer member 30 which connects a bottom end 56 of the sensor probe 28 to the bracket 20. Like its top end 54, the sensor probe 28 preferably has a circumferential groove (not shown) sized to engage with a bore (not shown) in a free end 58 of the stabilizer member 30. The stabilizer member 30 also has a fixed end 60 attached to the bracket 20, preferably via a snap-fit or other rigid connection, however, an adhesive may also be used. The stabilizer member 30 is preferably a plastic component having a living hinge 62 of decreased thickness between the ends 58, 60. The living hinge 62 allows flexing of the stabilizer member 30 in the longitudinal direction but not in the lateral or transverse directions. Thus, the stabilizer member 30 allows the sensor probe 28 to induce strain from buoyant forces (upward or downward), but prevents the sensor probe 28 from moving laterally and transversely by providing approximately equal and opposite side forces that cancel out the loads of the sloshing fuel, thereby reducing or eliminating strain from the side loads.

Further, referring still to FIG. 1, a fuel delivery module (FDM) 66 in which the bracket 20, fuel pump 22 and sensor probe 28 can be disposed further reduces side forces on the sensor probe 28 caused by sloshing fuel. The FDM cup 66, as known in the art, is preferably made of a suitable plastic material defining a generally cylindrical cup having openings (not shown) at its bottom though which fuel can flow and be captured within its cylindrical walls. The bottom of the FDM cup 66 is positioned near the bottom of the fuel tank 12 and is also used to maintain fuel 14 near the fuel pump 22 in low fuel level conditions.

Although the stabilizer member 30 and the FDM cup 66 reduce much of the affects of side loads on the sensor probe 28 from sloshing fuel as described above, the output voltage of the strain gauge 26 can be processed using anti-sloshing algorithms stored in the control module or in a separate anti-sloshing module (not shown) to further reduce adverse affects of sloshing level on fuel level measurements. For example, anti-sloshing algorithms can be processed to average periodically sampled output voltages or currents over a prescribed time period, such as one minute. This substantially eliminates widely fluctuating fuel level signals from being sent to the fuel gauge. The FDM cup 66 can also be used to protect the sensor probe 28 during shipping and handling of the fuel sensor 10 when sold as a replacement part.

The present invention may include other aspects not specifically delineated in the aforementioned preferred embodiments. The above in no way is intended to limit the scope of the invention. Accordingly, in order to apprise the public of the full scope of the present invention, reference must be made to the following claims.

I claim:

1. A fuel sensor for sensing a level of fuel in a motor vehicle fuel tank, the fuel tank defining a storage volume for containing the fuel and having an interior mounting to which the fuel sensor is affixed, the fuel sensor comprising:

a cantilever member extending in a substantially horizontal direction from the mounting to a free end, the cantilever member being substantially rigid but allowing vertical deflection;

a probe affixed at the free end of the cantilever member and extending therefrom in a substantially vertical orientation from proximate a top of the fuel tank to proximate a bottom of the fuel tank, the probe encountering a vertical buoyancy force equal to the volume of fuel displaced by the probe;

a strain gauge having at least one sensing element rigidly coupled to a surface of the cantilever member thereby effecting an electrical change in the sensing element corresponding to the strain in the cantilever member caused by the buoyancy force acting on the probe; and a stabilizer member affixed at one end to the mounting and at an opposing end to the probe vertically spaced from the cantilever member, the stabilizer member having a pivot segment between the ends permitting the probe to move vertically but substantially restricting horizontal movement;

whereby the electrical change in the strain gauge sensing element can be used to indicate the level of fuel in the fuel tank.

2. The fuel sensor of claim 1, wherein the probe defines a profile corresponding to the profile of the fuel tank substantially throughout the height of the fuel tank.

3. The fuel sensor of claim 1, wherein the probe is a closed-cell foam material.

4. A fuel sensor for sensing a level of fuel in a motor vehicle fuel tank, the fuel tank defining a storage volume for containing the fuel and having an interior mounting to which the fuel sensor is affixed, the fuel sensor comprising:

a cantilever member extending in a substantially horizontal direction from the mounting to a free end, the cantilever member being substantially rigid but allowing vertical deflection;

a probe affixed at the free end of the cantilever member and extending therefrom in a substantially vertical orientation from proximate a top of the fuel tank to proximate a bottom of the fuel tank, the probe encountering a vertical buoyancy force equal to the volume of fuel displaced by the probe;

a strain gauge having at least one sensing element rigidly coupled to a surface of the cantilever member thereby effecting an electrical change in the sensing element corresponding to the strain in the cantilever member caused by the buoyancy force acting on the probe; and a stabilizer member affixed at one end to the mounting and at an opposing end to the probe, the stabilizer member having a pivot segment between the ends permitting the probe to move vertically but substantially restricting horizontal movement of the probe;

whereby the electrical change in the strain gauge sensing element can be used to indicate the level of fuel in the fuel tank;

wherein a top end and a bottom end of the probe have a circular cross-section and the cantilever member and stabilizer member each have a bore sized to receive the respective top and bottom ends of the probe in a press-fit connection.

5. The fuel sensor of claim 1, further comprising a fuel delivery module cup substantially surrounding the probe.

6. The fuel sensor of claim 1, wherein the cantilever member is a ceramic board and into which the strain gauge is etched.

7. The fuel sensor of claim 1, wherein the pivot segment of the stabilizer member is a living hinge.

8. A method for sensing the level of fuel in a motor vehicle fuel tank, comprising the steps of:

mounting a sensor probe in the fuel tank in a substantially vertical orientation from proximate a top to a bottom of the fuel tank so as to displace fuel within the tank and be movable vertically but substantially horizontally constrained at two vertically spaced locations;

deflecting a flexing member to which the probe is attached by a buoyant force of the fuel acting on the probe equal to the weight of a volume of fuel displaced by the probe;

sensing, with a strain gauge, the strain in the flexing member resulting from the buoyant force deflection of the flexing member;

measuring a voltage difference across the strain gauge, the voltage difference being the difference of an input voltage and an output voltage;

calibrating the voltage difference to a correspond to a particular fuel level; and displaying the fuel level on a fuel gauge.

9. The method of claim 8, further comprising the steps of periodically sampling the voltage difference and averaging multiple voltage samples over a prescribed period.

10. The method of claim 8, wherein the probe defines a profile corresponding to the profile of the fuel tank substantially throughout the height of the fuel tank.

11. The method of claim 8, wherein the probe is a lightweight closed cell foam material.

12. The method of claim 8, wherein the probe is stabilized by a stabilizing member so that it is substantially restricted from moving in a lateral plane but allowed to move in a substantially vertical direction.

13. The method of claim 12, wherein the stabilizing member includes a living hinge.

14. The method of claim 8, wherein the probe is substantially surrounded by a fuel delivery module cup.

* * * * *